United States Patent [19]

Cockerell

[11] 4,210,821
[45] Jul. 1, 1980

[54] APPARATUS FOR EXTRACTING ENERGY FROM MOVEMENT OF WATER

[75] Inventor: Christopher Cockerell, Southampton, England

[73] Assignee: Wavepower Limited, Southampton, England

[21] Appl. No.: 779,705

[22] Filed: Mar. 21, 1977

[30] Foreign Application Priority Data

Mar. 31, 1976 [GB] United Kingdom ............... 13039/76

[51] Int. Cl.² .............................................. F03B 13/00
[52] U.S. Cl. ........................................ 290/53; 290/54; 60/398; 60/500; 60/305; 417/332
[58] Field of Search ................. 417/100, 240, 330–332, 417/497, 499, 61; 60/495, 502, 500, 501, 505, 506; 290/42, 53

[56] References Cited

U.S. PATENT DOCUMENTS

| 341,021 | 5/1886 | Kierter | 417/100 |
|---|---|---|---|
| 365,133 | 6/1887 | Kessler | 417/61 |
| 1,008,683 | 11/1911 | Wall | 417/100 |
| 1,018,678 | 2/1912 | Nelson | 60/398 |
| 1,036,502 | 8/1912 | Marsden | 417/100 |
| 1,061,091 | 5/1913 | Lewis | 417/330 |
| 1,073,214 | 9/1913 | Carr | 417/100 |
| 1,078,323 | 11/1913 | Trull | 417/61 |
| 1,408,094 | 2/1922 | Kiersey | 60/500 |
| 1,551,113 | 8/1925 | Olsson | 417/330 |
| 1,604,632 | 10/1926 | Carter | 417/330 |
| 4,022,549 | 5/1977 | Gregg | 417/100 |
| 4,077,213 | 3/1978 | Hagen | 417/331 |

*Primary Examiner*—Gene Z. Rubinson
*Assistant Examiner*—John W. Redman
*Attorney, Agent, or Firm*—Pearne, Gordon, Sessions, McCoy & Granger

[57] ABSTRACT

This invention relates to apparatus for converting into useful energy movements imparted thereto by movement of water, preferably sea waves and/or sea currents, the apparatus comprising two or more interconnected members of which at least one is buoyant and which in use of the apparatus are movable relative to each other due to vertical motions of the water, at least one of said members being provided with or connected to means which in use of the apparatus is responsive to horizontal motions of the water, and means for converting the relative movements of said interconnected members and operation of the means responsive to horizontal motions of the water into useful energy, such as electricity.

23 Claims, 26 Drawing Figures

APPARATUS FOR EXTRACTING ENERGY FROM MOVEMENT OF WATER

BACKGROUND OF THE INVENTION

This invention relates to apparatus for converting into useful energy movements imparted thereto by movements of water, preferably sea waves and/or sea currents.

Various forms of apparatus are known having a movable member which is moved by sea waves relative to a fixed structure and whose movement is converted to usable energy. The fixed structure is usually mounted on the sea bed and this produces vast engineering problems and difficulties. It also means that such apparatus cannot be used in great depths of water.

The known apparatus usually can only extract energy from one direction of water, i.e. either horizontal movement or vertical movement but not both. This greatly reduces the efficiency of the apparatus.

SUMMARY OF THE INVENTION

This invention relates to apparatus for converting into useful energy movements imparted thereto by movement of water, preferably sea waves and/or sea currents.

An object of the present invention is to provide apparatus which is buoyant and can be moored by cable or the like using conventional mooring techniques.

Another object of the invention is to provide apparatus which can extract energy from vertical and horizontal movement of water.

According to the present invention there is provided apparatus for converting into useful energy movements imparted thereto by movement of water, comprising two or more interconnected members of which at least one is buoyant and which in use of the apparatus are movable relative to each other due to vertical motions of the water, at least one of said members being provided with or connected to means which in use of the apparatus is responsive to horizontal motions of the water, and means for converting the relative movements of said interconnected members and operation of the means responsive to horizontal motions of the water into useful energy.

Preferably said means responsive to horizontal motions comprises a member provided on at least one of the members or connected thereto and which in use of the apparatus is movable relative thereto due to horizontal motions of the water.

BRIEF DESCRIPTION OF THE DRAWINGS

To the accomplishment of the foregoing and related ends, the invention then comprises the features hereafter fully described and particularly pointed out in the claims, the following description and annexed drawings setting forth in detail certain illustrative embodiments of the invention, these being indicative however of only some ways in which the principle of the invention may be employed.

In said annexed drawings.

DESCRIPTION OF THE PREFERRED EMBODIMENTS

Figure 1:
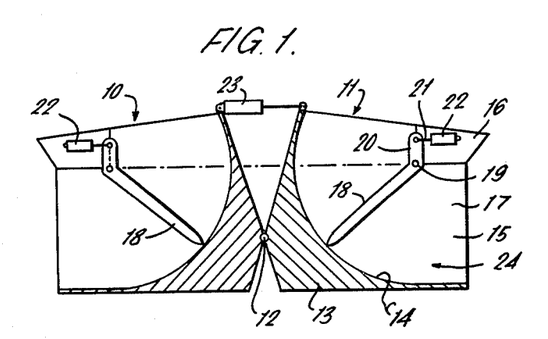
FIG. 1 is a sectional view through apparatus according to a first embodiment of the invention for extracting energy from sea waves.
Figure 2:
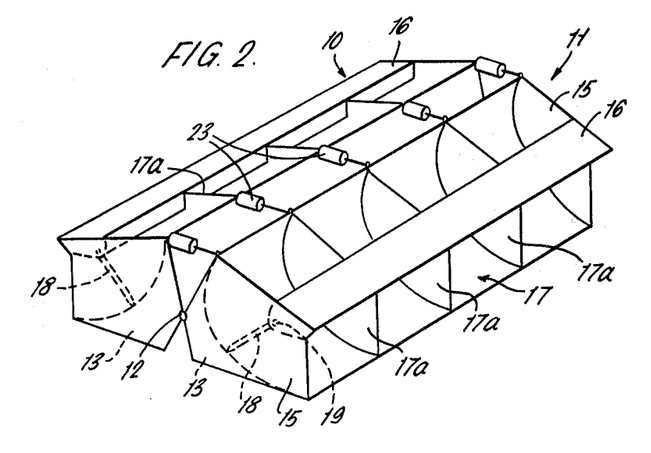
FIG. 2 is a perspective view of the apparatus of FIG. 1.

The apparatus shown in FIGS. 1 and 2 can be used for extracting energy from sea waves and consists of two buoyant members 10 and 11 which are identical to each other and which are hingedly connected together at 12 by a suitable hinge. Each member 10 and 11 consists of an elongate structure 13 having a curved surface 14. The structure 13 is provided with end walls 15 and the end walls 15 are interconnected by a transverse wall 16 which forms with the member 13 a duct 17 which is divided by walls 17a into a plurality of parallel ducts. The duct 17 is only divided for engineering convenience and may be undivided.

Located in each duct 17 is a flap 18 which is pivoted at 19 to the wall 16. Each flap 18 is provided with a bellcrank portion 20 to which is connected a rod 21 of a hydraulic or pneumatic piston and cylinder device 22 which constitutes a pressure pulse transmitter for producing and transmitting pressure pulses produced by movement of the flaps 18. The members 10 and 11 are interconnected by a plurality of piston and cylinder devices 23 which also constitute pressure pulse transmitters.

In use of the apparatus shown in FIGS. 1 and 2 the members 10 and 11 float on the water and their buoyancy is such that the mean level of the surface of the water lies just below the bottom of the transverse members 16. Water will tend to flow past the flap 18 into the upper part of the duct 17 and this excess water will be pushed out of the duct 17 due to movement of the flap 18 and this will spill over the member 16. With the low contour of the device the tops of breaking waves will pass over the device under storm conditions. Vertical or heave motion of a wave causes the members 10 and 11 to move relatively to each other about the hinge 12 and the devices 23 produce pressure pulses which can be used for generating electricity or for pumping water or for any other use. The pressure pulses may be transmitted ashore where they are used to generate electricity or the electricity may be generated aboard the apparatus or aboard adjacent apparatus and then transmitted ashore for use.

Horizontal movement of the wave will also have energy which can be extracted by the apparatus. If the direction of horizontal movement of water within the wave is in the direction indicated by the arrow 24 then water will flow into the duct 17 of the unit 11 will cause the flaps 18 of that unit 11 to move in a clockwise direction about the hinge 19 and this movement will be transmitted via the bellcrank 20 to the associated hydraulic pulse transmitter 22 which will produce pressure pulses. In the trough of the wave the water will be moving in the opposite direction and the water will have a motion out of the duct 17 and the flaps 18 will move in an anticlockwise direction. These pressure pulses produced by units 22 can also be used for generating electricity or for pumping water or for any other use. During horizontal movement of the water to the left as viewed in the drawing the unit 10 will react against a heaving but non-surging mass of water which lies in the duct 17 of the unit 10 and this will also cause movement of the flap 18 of the unit 10.

With the apparatus described with reference to FIGS. 1 and 2 it will be seen that energy is extracted from the vertical movement of a wave due to the heave movement of the units 10 and 11 and also from the horizontal or surging movements of the water. Each unit 10 and 11 may have a depth of approximately 50 feet, a length of 60 feet and a width of 200 feet. It will be appreciated that these dimensions are given purely as an example.

Figure 3:
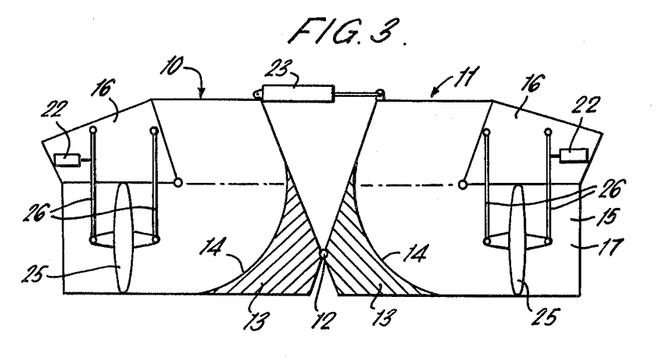
FIG. 3 is a section similar to that of FIG. 1 showing a second embodiment.

The embodiment shown in FIG. 3 is similar to that described with reference to FIGS. 1 and 2 except that the flaps 18 are each replaced by a valve member 25 which is carried on a pair of levers 26. One of the levers of each pair of levers 26 is connected to the pulse transmitter 22. During horizontal or surge movement of the water the valve members 25 will move bodily within the respective duct 17. The portion of each duct 17 which lies beyond the flaps 18 and the valve members 25 is used as a tuning duct and may be proportioned to alter the natural period of the device. It is conceivable that air contained within this portion of the duct 17 could be used to drive a turbine as this air will be pumped by the movements of the flaps 18 or valve members 25 and suitable air inlet and outlet valves, not shown, will be provided for controlling air flow into and out of the upper end of the duct 17. It will be appreciated that where the duct 17 is to supply air to a turbine then the upper end of the duct 17 will be provided with valve means which are open when the air pumped by the flap 18 or valve member 25 passes to the turbine unit, and closed when the flap 18 or valve member 25 moves in the opposite direction, air then being drawn into the duct 17 through the turbine unit and inlet valves by the flap 18 or valve member 25 to drive the turbine unit unidirectionally.

Figure 4:
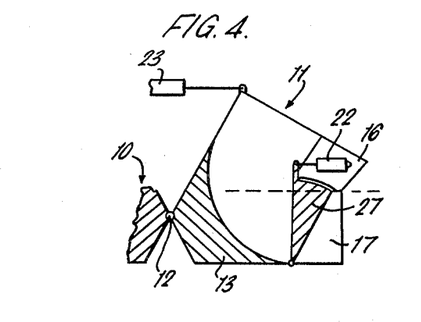
FIG. 4 is a section through one unit of a third embodiment.

FIG. 4 is an embodiment which is somewhat similar to that of FIGS. 1 and 2 except that each flap 18 is replaced by a valve member 27 which is pivoted at its bottom end to the structure 13 and is connected at its upper end to the transmitter device 22. Such an arrangement more nearly conforms to the water particle movement within a wave and will therefore have lower losses at the expense of engineering simplicity.

Figure 5:
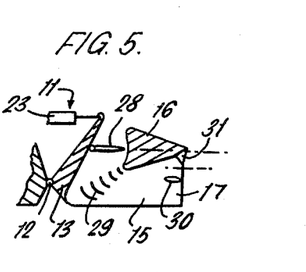
FIG. 5 is a diagrammatic section through one unit of a fourth embodiment.

The embodiment shown in FIG. 5 shows a valve member 28 which is pivotally mounted in the duct 17 downstream of a plurality of curved guide vanes 29. The upstream end of the duct 17 is also provided with a guide vane 30. The structure 16 which extends between the end plates 15 is provided with a flexible or pivotable sealing device 31 in order to reduce to a minimum the flow of air into the duct 17 when the water is surging out of the duct 17 in the trough of a wave. The flexible or pivotable sealing member 31 may comprise a flexible skirt-like structure of the type normally used on hovercraft, or alternatively it may be a hinged member which folds in when the surge of water is towards the duct 17, and moves out at an angle when the direction of surge of water is out of the duct 17. The flap 28 is connected to a transmitter device 22 which is not shown on this Figure.

Figure 6:
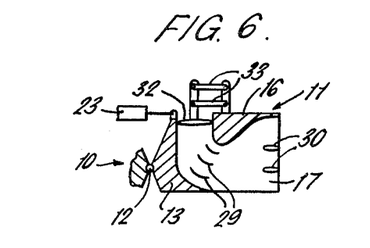
FIG. 6 is a diagrammatic section through one unit of a fifth embodiment.

FIG. 6 shows another alternative embodiment which is similar to that of FIG. 5 but in which the flap 28 is replaced by a piston-like member 32 carried by a parallel linkage 33 from the structure 16. Movement of the linkage 33 via the piston-like member 32 will be transmitted to a pulse transmitter device 22 (not shown) as in the previous Figures.

Figure 7:
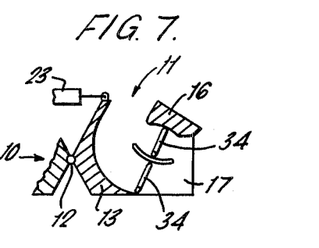
FIG. 7 is a diagrammatic section through one unit of a sixth embodiment.

FIG. 7 shows that the duct 17 can be divided longitudinally into a pair of parallel ducts each provided with its own pivotable flap 34, each of which is connected to a device 22 not shown on this Figure.

Figure 8:
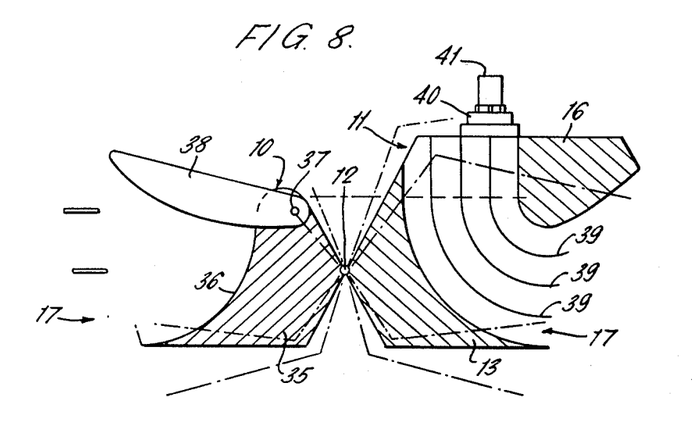
FIG. 8 is a diagrammatic cross-section through two different units, said units respectively constituting a seventh and an eighth embodiment.

FIG. 8 shows two further embodiments of units 10 and 11. The units 10 and 11 in practice will be similar to each other but in this Figure one embodiment is shown on the left of the Figure and the other on the right of the Figure purely for convenience. The embodiment of unit 10 shown on the left of FIG. 8 consists of a buoyant structure 35 provided with a duct having a curved surface 36. Pivoted at 37 to the structure 35 is a member 38 provided with a curved underside. Although not shown in the drawing, the movement of the member 38 about the pivot 37 is transmitted to a hydraulic or pneumatic pulse transmitter device similar to the devices 22 of the previous embodiments. Two identical members 10 and 11 are pivotably connected together at 12 as in the previous embodiments and the members 10 and 11 will be interconnected by a pulse transmitter device or device 23 as in the previous embodiments but which is not shown in FIG. 8. The unit 11 shown on the right of FIG. 8 constitutes a further embodiment, as stated, and is provided with a duct 17 as in the previous embodiments and the duct 17 is divided longitudinally into a plurality of curved passages by curved deflectors 39. Any surge of water into the duct 17 is used to force air contained in the duct passages through valves (not shown) to drive an air turbine 40 which is drivingly connected to an electrical generator 41, and surge of water out of the duct 17 draws in air via valves (not shown) which also drives the turbine 40 as it flows into the duct 17. The embodiments of FIG. 8 are able to extract energy due to the heave motions of the wave and is also able to extract energy from the surge movements of the wave.

Figure 9:
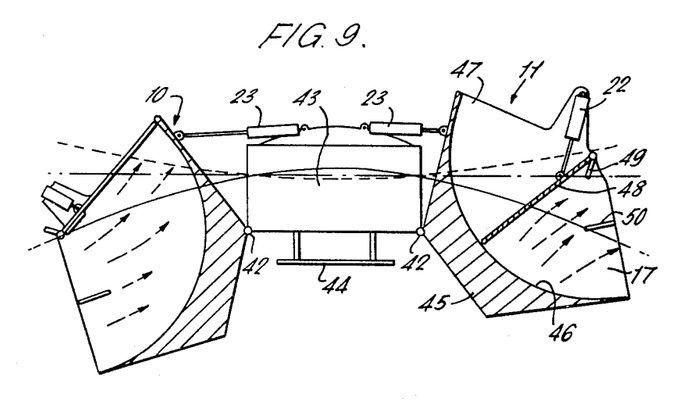
FIG. 9 is a digrammatic cross-section through a ninth embodiment.

FIG. 9 shows an embodiment in which the two units 10 and 11 are each hingedly connected at 42 to a buoyant inertia member 43. This Figure shows the relative position of unit 10 and member 43 on the crest of a wave and the relative position of unit 11 and member 43 in the trough of a wave. The buoyant inertia member 43 is provided with a pitch stabilizing plate 44 which is spaced from the underside of the member 43. The units 10 and 11 are identical and each consists of a structure 45 provided with a curved surface 46 forming a duct 17 and secured to the structure 45 are end plates 47. Pivotably connected to the end plates 47 and extending therebetween is a flap 48 which is connected to a pulse transmitter device 22. A sealing member 49 is provided at the hinge end of the plate 48. Extending between the end plates 47 is a stabilizing plate 50. Each member 10, 11 is connected to a hydraulic or pneumatic pulse transmitter device 23 provided on the buoyant member 43. The energy is extracted from the heave movement of the wave by the pulse transmitter devices 23. The surge movement of the wave causes the plates 48 to pivot and thus the transmitter devices 22 will create pressure pulses in response to the surge motion of water both into and out of the duct 17. During surge motion water will flow into the duct 17 the plate 48 will pivot upwardly about its hinge and when the surge of water is out of the duct 17 the other plate 48 is pivoted downwardly about its hinge due to the suction created by water flowing out of the duct 17.

Figure 10:
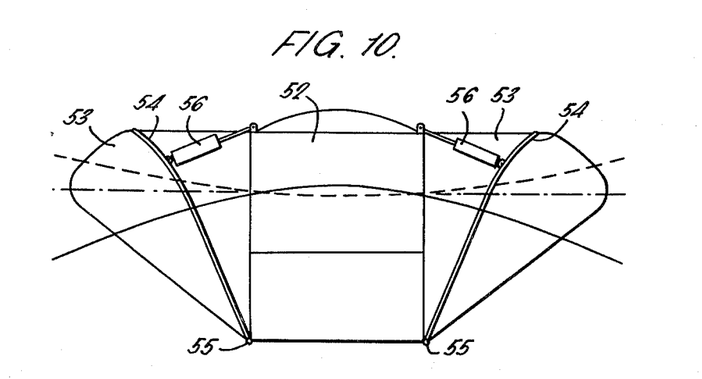
FIG. 10 is a diagrammatic cross-section through a tenth embodiment.

FIG. 10 discloses a device consisting of buoyant member 52 from each end of which extend end plates 53. Located between the end plates 53 on each end of the member 52 are plates 54 which are hinged at 55 to the member 52. Each plate 54 is connected via a pulse transmitter device 56 to the member 52. As will be seen the wave acts on the plates 54 in order to move them about their pivot connections 55 and this movement is transmitted to the devices 56 from which the energy in the form of pressure pulses can be extracted for driving an electrical generator.

Figure 11:
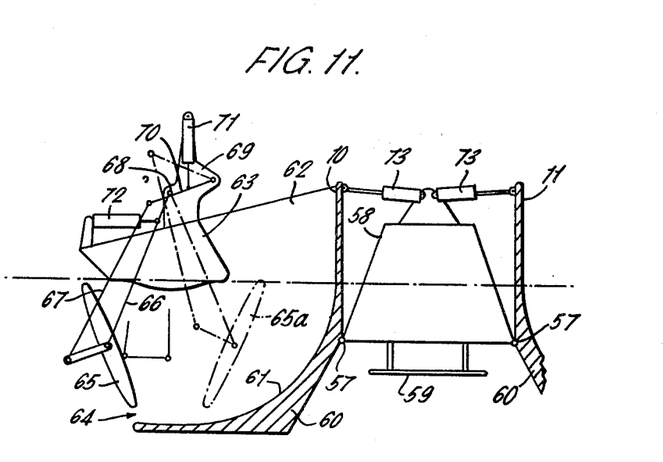
FIG. 11 is a diagrammatic cross-section through an eleventh embodiment.

All of the embodiments described so far are only capable of extracting energy due to heave and surge movements of the wave, i.e. vertical and horizontal motions. It is known that in a wave of water the movement of the particles of water within the wave varies in accordance with the depth of the particles from the surface of the water and this relative movement of the particles of water can be used for producing energy. FIG. 11 shows an embodiment which is capable of extracting energy from heave movements (vertical motion), surge movements (horizontal motion) and also from this extra source of energy due to relative movement of the water particles which will be referred to as "pitch" movement. The apparatus consists of two units 10 and 11 which are each hinged at 57 to an intermediate buoyant inertia member 58 which is provided on its underside with a stabilizing plate 59. Each member 10 and 11 consists of structure 60 provided with a curved surface 61 and the structure 60 extends between end walls 62 which also carries structure 63 to form a duct 64. Located at the upstream end of the duct 64 is a valve member 65 which can be moved bodily between the full line position shown and the dotted line position 65a. The valve member 65 is carried by a pair of links 66, 67. The link 66 is pivotally connected at 68 to structure 69 carried by the structure 63. The link 67 is hingedly connected to a link 70 which is pivotably connected at its other end to the structure 69 and intermediate its ends the link 70 is connected to the piston rod of a hydraulic pulse transmitter device 71. The link 66 is connected intermediate its ends to the piston rod of a hydraulic pulse transmitter device 72. Each of the units 10 and 11 is connected to a hydraulic pulse transmitter device 73 connected to the buoyant member 58. Heave movements of the wave will cause the members 10 and 11 to move about the hinge connections 57 relative to the buoyant inertia member 58 and thus this movement is transmitted to the pulse transmitter devices 73. Surge movement of the wave will cause the valve member 65 of each unit to move bodily within the duct 64 and this movement is conveyed to the pulse transmitter devices 72. The particles of water reacting on the valve 65 will cause it to pivot about its connection with the link 66 and this pivoting movement is transmitted to the pulse transmitter device 71 via the links 67 and 70. It will therefore be appreciated that the apparatus disclosed in FIG. 11 is able to extract energy produced by the major movements of the particles of water of a wave.

Figure 12:
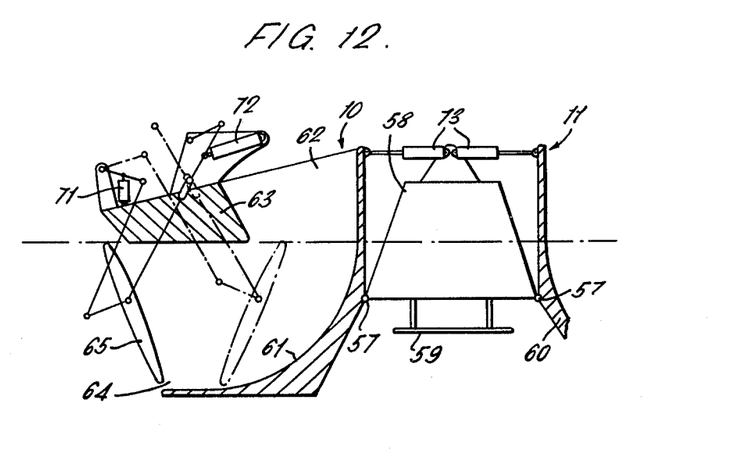
FIG. 12 is a diagrammatic cross-section through a twelfth embodiment.

FIG. 12 shows an embodiment which is very similar to that disclosed in FIG. 11, the major difference lying in the linkage arrangement between the valve member 65 and the pulse transmitter devices 71 and 72. In the embodiment of FIG. 12 the bodily movement of the valve member 65 is linear and therefore the underside of the structure 63 can be straight instead of having to have the complicated curved configuration as shown in FIG. 11.

The power characteristic of a wave is $LH^2$ and therefore the power take-off for each hydraulic pulse transmitter device must follow a square law movement.

A plurality of any of the apparatus as described may be located one behind another in the direction of wave motion, the depth of the units of each apparatus being greater than the preceding apparatus so that each apparatus is able to extent energy from the part of a wave which has not had energy extracted from it by a preceding apparatus.

By using plates, valves, pistons, air turbines to extract power from surge movement the horizontal surge of water is constrained by the duct to be a vertical surge and therefore the water behind each unit while still heaving is without surge. The surge of the first body is reduced by being reacted onto the second hinged body which can push against a surgeless body of water. By suitably dimensioning the duct control can be obtained of the inertia period of the device.

The main structural components of the units 10 and 11 of each apparatus may be hollow so as to give the required buoyancy. It will also be appreciated that when a wave is encountered which is of such magnitude that the apparatus cannot cope with it then water will spill out of the ducts.

Figure 13:
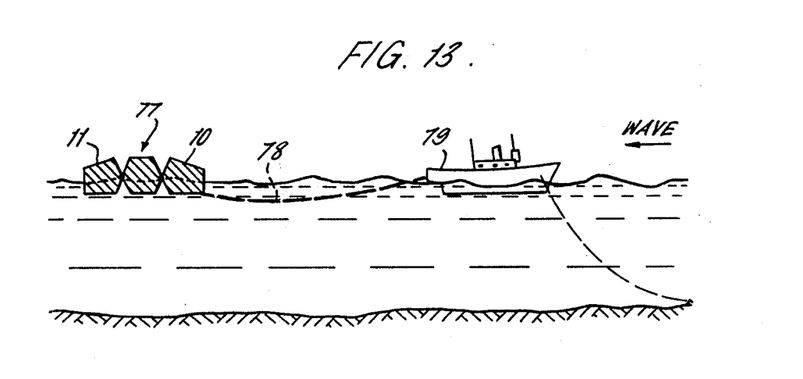
FIG. 13 is a diagrammatic illustration of an apparatus of any of the embodiments of FIGS. 9 to 12 moored to a mother ship or buoy.

In developing apparatus for extracting large amounts of energy from moving water, all sorts of problems arise, the chief of which are: mooring, survival in a storm, efficiency in short, medium and long waves, the effect of tidal streams and ocean currents, and the problems of converting a slow speed oscillatory motion into usable power. If heave power, i.e. vertical motion, only is extracted and the lower efficiency accepted, with an arrangement such as that which is described and claimed in copending United Kingdom Patent Applications Nos. 35523/72 and 17597/75 and consists of a plurality of interconnected buoyant members and hydraulic or pneumatic pulse transmitters, then the mooring loads are modest because the forces are largely vertical. If, however, the surge energy in the movement of the water particles back and forth parallel to the surface of the water is extracted by one of the arrangements shown in FIGS. 1 to 12, then the apparatus will itself surge to some extent back and forth, and this will result in increased mooring loads. One way of resisting these loads is to use a mooring arrangement as shown in FIG. 13, in which the apparatus 77 for extracting energy is moored by a cable or rope 78 to a mother ship 79 or to a large buoy which is itself moored to the sea bed.

In storm conditions the apparatus must be able to get rid of the excess surge movements of water, by allowing the excess of water to escape when the hinged flap or valve member of FIGS. 1 and 2, 3, 4, 5, 6, 7, 9, 11, 12, moves far enough to open the duct to atmosphere.

Figure 14:
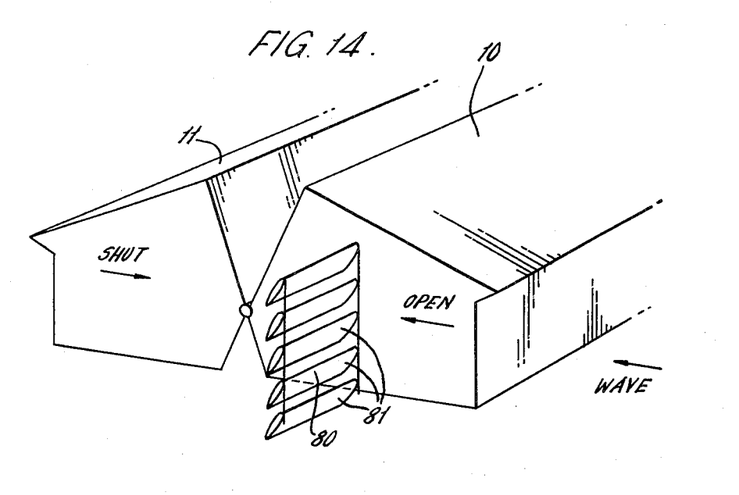
FIG. 14 is a diagrammatic perspective view of an apparatus of any of the embodiments of FIGS. 1 to 12 provided with means for generating forces in a direction towards the mooring.

In storm conditions, the large surge forces, windage and the drift of water to leeward can to an extent be counteracted by fitting extra flap devices 80 at the ends of the units 10 and 11 at right angles to the wavefront, which rectify the surge forces by allowing the moving particles to pass through them to leeward but to impede the following surge to windward, thus generating an opposing force towards the mooring, as shown in FIG. 14.

The flap device 80 has a plurality of hinged slats 81 which close and impede the surging particles of water when they travel in the direction opposite to that of the wave and open and do not impede the surging particles when they travel in the opposite direction. Such counter-acting devices could be fixed to and extend from the underside of the apparatus.

One way of reducing the surge motion of the apparatus is to use the inertia of a large body of water, which in practice means a large container partially filled with water and preferably compartmented to reduce internal surging. Such a body is shown at 43, 52 and 58 in the centre of FIGS. 9, 10, 11 and 12, separating the hinged members 10 and 11. Such an anti-surge body could take any convenient form.

Figure 15:
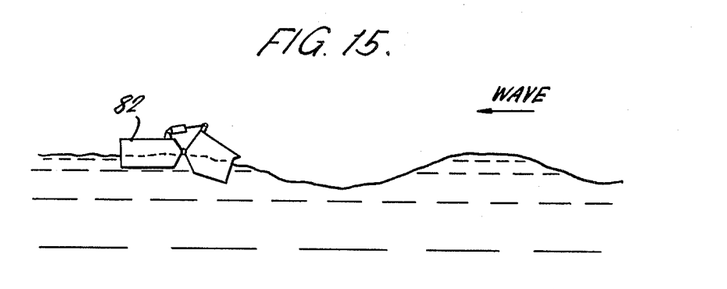
FIG. 15 is a diagrammatic side view of an apparatus consisting of one of the movable members of any of the embodiments of FIGS. 1 to 12 provided with an inertia body.

It will be understood that all the embodiments of apparatus shown in FIGS. 1 to 12 will operate with waves from either direction. If an apparatus is moored near a coast a bi-directional arrangement may not be necessary, and it will be appreciated that one half of any of the embodiments may be used for example by attaching a unit to and pivoting it from a body 82 of sufficient inertia as shown in FIG. 15.

Figure 16:
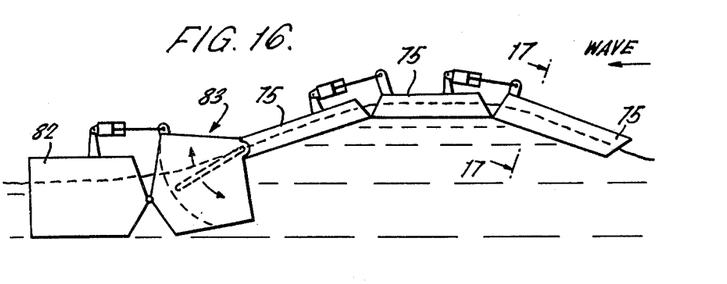
FIG. 16 is a side view of a row of buoyant members for extracting energy from vertical motions of water provided at one end with an inertia body and a device for extracting energy from horizontal motions of water.
Figure 17:
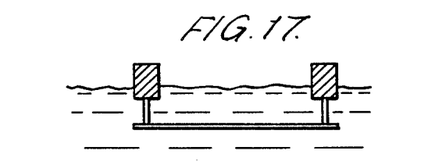
FIG. 17 is a section taken along the line 17—17 of FIG. 16.
Figure 18:
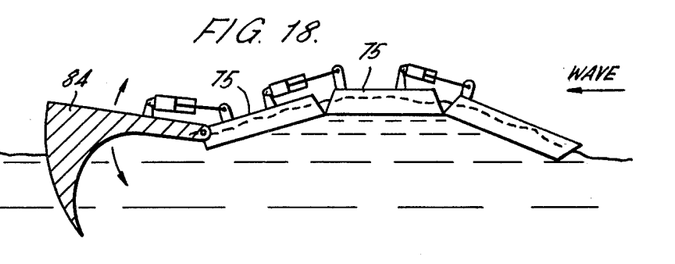
FIG. 18 is a side view of a row of buoyant members for extracting energy from vertical motions of water provided at one end with means for extracting energy from horizontal motion of the water.
Figure 19:
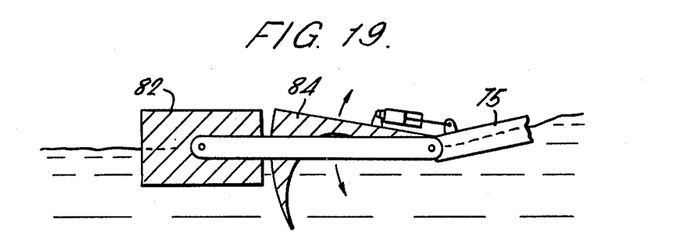
FIG. 19 is a side view of the apparatus of FIG. 18 provided at one end with an inertia body.
Figure 20:
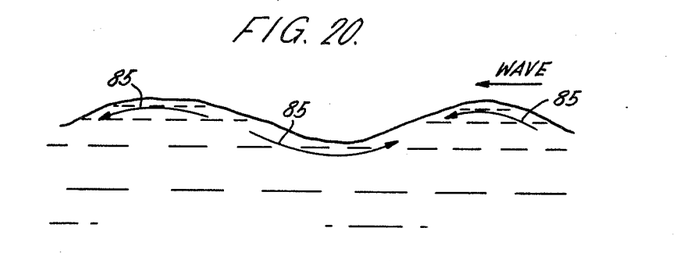
FIG. 20 is a diagram of a wave showing the direction of movement of water particles within the wave.

In operation, since the apparatus described are not 100% efficient, some of the wave energy passes through the apparatus, and some more is reflected towards the wavefront. This latter energy forms standing waves to windward of the apparatus. Some of this energy can be retrieved by locating a surge energy extracting unit 83 behind a series of one or more heave energy extracting units 75 as shown in FIG. 16. With this embodiment and three heave energy extracting units 75 extract some of the heave energy as the wave passes from right to left as viewed in this Figure, and also some of the reflected heave energy as it passes back from the surge unit 83 towards the right. Where the members 75 consist of solid pontoon-like members the front member 75 may be provided on its underside with a plate which is spaced therefrom so as to prevent the front member 75 from lifting off the surface of the water under storm conditions. FIG. 18 shows a similar arrangement, in which the surge energy extracting unit 84 lifts to let excess surge through the unit under storm conditions. Either arrangement of FIGS. 16 and 18 can be fitted with a body 82 possessing inertia such as shown in FIG. 20. The surge energy extracting unit 84 may be curved in plan view so as to focus the line of reflected energy along the line of members 75. The cross-section of members 75 shown in FIG. 17 is an example only and the members may have any other suitable cross-section.

Figure 21:
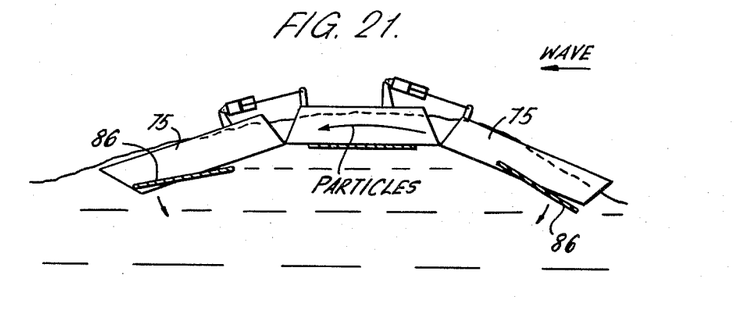
FIG. 21 is a diagrammatic side view of a row of buoyant members provided with canted plates.
Figure 22:
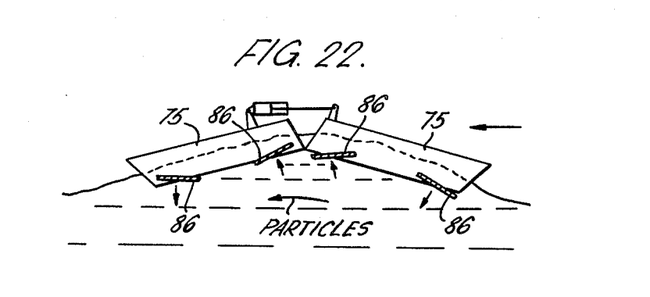
FIG. 22 is a diagrammatic side view of two interconnected buoyant members each provided with two canted plates.
Figure 23:
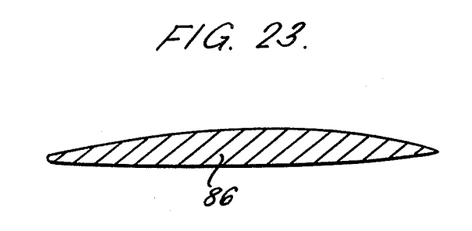
FIG. 23 is a cross-section through a plate.

Since the surging particles within the wave move as shown by the arrows 85 in FIG. 20, it is possible to extract both heave power and surge power at the same time by providing plates 86 which can be canted on the heave units 75 of FIGS. 16 to 19 as shown in FIGS. 21 and 22. The canting of the plates 86 increases the relative movement of the units 75 one to the other due to the surge currents passing over the canted plates 86, causing upward and downward movements dependent upon the direction of the cant and the direction of the surge. Such an arrangement would be omnidirectional unless means are provided to reverse the cant of the plates 86. These plates 86 should, for best efficiency, have a convex top surface and a less convex bottom surface, as shown in FIG. 23.

If any of the devices which derive some of its power from surge is moored in tidal or ocean currents, these currents will put an out-of-centre bias on the plate or other member actuated by the surge forces. These members can be brought back to centre so that they oscillate about their designed mean position by arranging for an opposite bias to be put on by a hydraulic jack or other device. Such a recentring could be arranged to be done automatically using known technology.

One of the shortcomings of using energy extracted from sea-waves is the occasional flat calm. In the oceans this is much rarer than windless days and does not last for long but nevertheless is serious. In certain cases it might be worthwhile to design the wave-power energy extractor apparatus in such a way that it could not only extract the oscillating energy of a wave system but also extract energy from the quasi steady tidal or ocean current.

Figure 24:
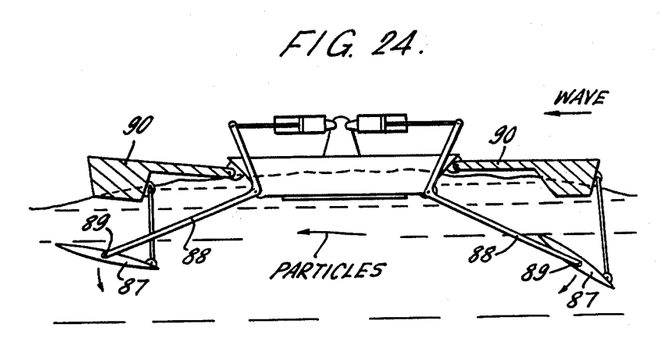
FIG. 24 is a side view of a further embodiment of apparatus for extracting power from sea waves or tidal currents.

Such apparatus is shown in FIG. 24. This is very similar to FIG. 21. If plates 87 are held fixed at appropriate angles with respect to arms 88, then in the presence of waves it will behave exactly as the embodiment of FIG. 21. If, however, they are freed to swivel about their axes 89, and the angle is controlled by buoyant members 90 or other means, then a non-oscillating current such as a tidal stream will cause them to move up and down, their angle of attack at the top and bottom of their stroke being reversed in sign by the action of the buoyant members 90 and their attachment to them. Such apparatus is capable of extracting power from both waves and tidal or ocean streams, or might be arranged solely for the extraction of power from tidal or ocean streams.

Each of the embodiments described may be provided with means for extracting energy from tidal sea currents which in most cases are normal to the direction of main wave motion where these devices will be positioned for use.

Figure 25:
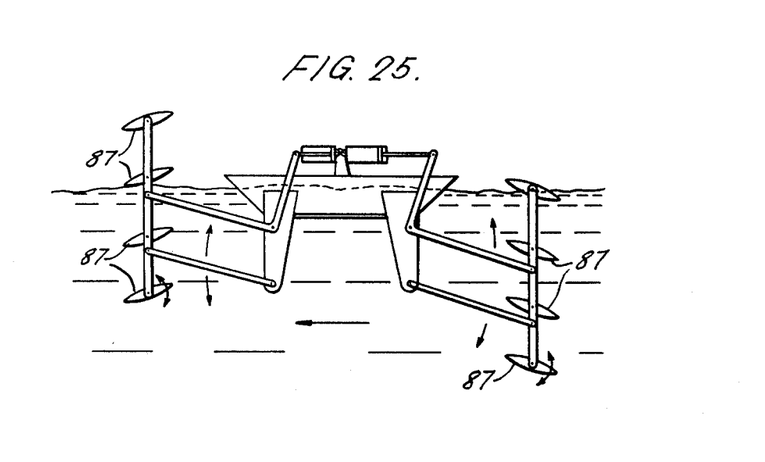
FIG. 25 is a side view of an embodiment for use in a tidal or ocean stream.

The means for extracting energy from tidal sea currents may be arranged to oscillate around a horizontal axis as in FIGS. 24 and 25 or alternatively can be arranged to oscillate around vertical axes, preferably with two sets operating in anti-phase to cancel out the reactive forces on the buoyant member or members.

Other more sophisticated methods can be used to control the angle of the plates 87 and to reverse the sign of the incidence of the plates 87 at the top and bottom of the stroke. Likewise, one, two or more plates 87 could be arranged in lattice form as shown in FIG. 25, so as to extract the maximum energy, which in the case of a tidal or ocean stream extend to the sea bed. The energy which can be extracted is proportional to the cube of the speed and the area of the plates.

All the devices described deliver their power in a slow speed random oscillatory form, and this has to be converted to something useful. The simplest system is to use hydraulic jacks, the oscillatory movement of which pumps up a hydraulic accumulator, the stored pressure driving a hydraulic motor which if electricity is wanted drives a generator, the output of which is transmitted where required. Other methods may be used for converting the energy extracted by the apparatus into a useful form.

Figure 26:
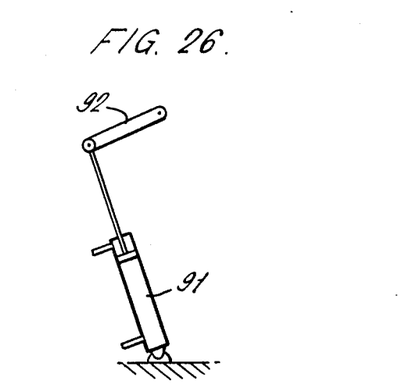
FIG. 26 is a diagrammatic view of a pneumatic or hydraulic pressure pulse transmitter device.

Two points arise with this arrangement. The first point is that inevitably there are losses in the jack, in the hydraulic motor and in the generator. The second point is that the power in a wave system is proportional to the square of the wave-height and to the period of the wave. The "linear" jack arrangement with a movement proportional to angle, which is shown in all the Figures for the sake of simplicity, is not suitable in practice because if it were arranged to be stiff enough for large waves and large movements, it would be too stiff for small waves and small movements. A more nearly correct arrangement is shown in FIG. 26, where the movement of the jack 91 is almost a square law function of the movement of the lever 92.

If electricity is required, rather than just rotary motion, then it is convenient if an arrangement is provided which converts the oscillating motion into electricity without the losses and complication of the intermediate hydraulic stage.

I, therefore, particularly point out and distinctly claim as my invention:

1. Apparatus for converting into useful energy movement imparted thereto by movement of water, comprising at least two interconnected buoyant members each having a substantially continuous surface which contacts the water so that in use of the apparatus said members move relative to each other about the interconnection due to vertical motions of the water, means for converting said relative movements of the interconnected members into useful energy, at least one of said members being provided with a member which in use of the apparatus is movable relative thereto in response to horizontal motions of the water, and means for converting the movement of said member into useful energy, said apparatus in use floating on the surface of the water and being free from any vertical reaction forces between itself and any member supported from the bed of the water, said means responsive to horizontal motions comprising a flap member located for movement within a duct provided in the associated one of said members and movable by water flowing into and out of the duct due to surge motion of the water, said flap member being operatively connected to means for converting its movement into useful energy, said flap being pivotally connected to the associated one of said members, and each duct having a curved wall whose radius is struck from the pivot axis of said flap.

2. Apparatus as claimed in claim 1, wherein said means responsive to horizontal motions comprises a member provided on at least one of the members and which in use of the apparatus is movable relative thereto due to horizontal motions of the water.

3. Apparatus as claimed in claim 1, wherein said means responsive to horizontal motions comprises a flap member located for movement within a duct provided in the associated one of said members and movable by water flowing into and out of the duct due to surge motion of the water, said flap member being operatively connected to means for converting its movement into useful energy.

4. Apparatus as claimed in claim 1, wherein said means responsive to horizontal motions comprises a flap member located for movement within a duct provided in the associated one of said members and movable by water flowing into and out of the duct due to surge motion of the water, said flap member being operatively connected to means for converting its movement into useful energy and wherein the associated one of said members is provided with a plurality of parallel ducts, each duct being provided with a flap member.

5. Apparatus as claimed in claim 1, wherein said means responsive to horizontal motions comprises a flap member located for movement within a duct provided in the associated one of said members and movable by water flowing into and out of the duct due to surge motion of the water, said flap member being operatively connected to means for converting its movement into useful energy, and wherein said member responsive to horizontal motions comprises a flap member carried by levers from the associated one of said members.

6. Apparatus as claimed in claim 1, wherein said means responsive to horizontal motions comprises a flap member located for movement within a duct provided in the associated one of said members and movable by water flowing into and out of the duct due to surge motion of the water, said flap or valve member being operatively connected to means for converting its movement into useful energy and wherein each duct is provided with transversely extending curved guide vanes.

7. Apparatus as claimed in claim 1, wherein said means responsive to horizontal motions comprises a flap member located for movement within a duct provided in the associated one of said members and movable by water flowing into and out of the duct due to surge motion of the water, said flap member being operatively connected to means for converting its movement into useful energy, and wherein each flap member in addition to being bodily movable within the duct due to horizontal surge motion of water is also capable of being rotated about a transverse axis during its movement within the duct and means are provided for converting said rotational movement of the flap member into useful energy.

8. Apparatus as claimed in claim 1, wherein said means responsive to horizontal surge of water comprises a device connected to a buoyant member.

9. Apparatus as claimed in claim 1, wherein the means responsive to horizontal motion of water comprises at least one canted plate set at an angle relative to the horizontal provided on at least one of said interconnected members.

10. Apparatus as claimed in claim 1, comprising a pair of buoyant members hingedly connected together, both of said members being provided with means responsive to horizontal surge motion of water.

11. Apparatus as claimed in claim 1, comprising a pair of said buoyant members each hingedly connected to an intermediate buoyant inertia member.

12. Apparatus as claimed in claim 1, comprising a pair of said buoyant members each hingedly connected to an intermediate buoyant inertia member and wherein said buoyant inertia member is provided with a pitch stabilizing plate on its underside.

13. Apparatus as claimed in claim 1, wherein a surge rectifying device is provided on each end of at least one of said interconnected members.

14. Apparatus as claimed in claim 1, wherein said means for converting the relative movement of the interconnected members into useful energy comprises at least one of fluid pulse transmitter devices.

15. Apparatus as claimed in claim 1, wherein said means for converting the operation of said means responsive to horizontal surge motion into useful energy comprises at least one of fluid pulse transmitter devices.

16. Apparatus as claimed in claim 1, provided with means for extracting energy from sea currents and tidal streams.

17. Apparatus for converting into useful energy movement imparted thereto by movement of water, comprising at least two interconnected buoyant members each having a substantially continuous surface which contacts the water so that in use of the apparatus said members move relative to each other about the interconnection due to vertical motions of the water, means for converting said relative movements of the interconnected members into useful energy, at least one of said members being provided with a member which in use of the apparatus is movable relative thereto in response to horizontal motions of the water, and means for converting the movement of said member into useful energy, said apparatus in use floating on the surface of the water and being free from any vertical reaction forces between itself and any member supported from the bed of the water, said means responsive to horizontal motions comprising a flap member located for movement within a duct provided in the associated one of said members and movable by water flowing into and out of the duct due to surge motion of the water, said flap member being operatively connected to means for converting its movement into useful energy, and said member responsive to horizontal motions comprising a flap member carried by levers from the associated one of said members.

18. Apparatus for converting into useful energy movement imparted thereto by movement of water, comprising at least two interconnected buoyant members each having a substantially continuous surface which contacts the water so that in use of the apparatus said members move relative to each other about the interconnection due to vertical motions of the water, means for converting said relative movements of the interconnected members into useful energy, at least one of said members being provided with a member which in use of the apparatus is movable relative thereto in response to horizontal motions of the water, means for converting the movement of said member into useful energy, said apparatus in use floating on the surface of the water and being free from any vertical reaction forces between itself and any member supported from the bed of the water, said means responsive to horizontal surge motion of the water comprising a duct provided in at least one of said members, said duct having at one end an inlet for water and at its other end valve means for allowing air compressed by water flowing into the duct to flow into an air turbine to drive the same, said turbine being drivingly connected to an electrical generator.

19. Apparatus for converting into useful energy movement imparted thereto by movement of water, comprising at least two interconnected buoyant members each having a substantially continuous surface which contacts the water so that in use of the apparatus said members move relative to each other about the interconnection due to vertical motions of the water, means for converting said relative movements of the interconnected members into useful energy, at least one of said members being provided with a member which in use of the apparatus is movable relative thereto in response to horizontal motions of the water, and means for converting the movement of said member into useful energy, said apparatus in use floating on the surface of the water and being free from any vertical reaction forces between itself and any member supported from the bed of the water, said means responsive to horizontal surge of the water comprising a device connected to an end buoyant member of a plurality of interconnected buoyant members arranged in a row one behind the other, the depth of each buoyant member in the row being greater than the preceding member.

20. Apparatus for converting into useful energy movement imparted thereto by movement of water, comprising at least two interconnected buoyant members each having a substantially continuous surface which contacts the water so that in use of the apparatus said members move relative to each other about the interconnection due to vertical motions of the water, means for converting said relative movements of the interconnected members into useful energy, at least one of said members being provided with a member which in use of the apparatus is movable relative thereto in response to horizontal motions of the water, and means for converting the movement of said member into useful energy, said apparatus in use floating on the surface of the water and being free from any vertical reaction forces between itself and any member supported from the bed of the water, means for extracting energy from sea currents and tidal streams, said means for extracting energy comprising a plurality of vanes which are arranged horizontally one above another and connected to a mamber to cause said member to move vertically due to reaction of the current on the vanes.

21. Apparatus as claimed in claim 20, wherein each vane is pivotable about its longitudinal axis.

22. Apparatus as claimed in claim 20, wherein the vanes are arranged to move about vertical axes.

23. Apparatus as claimed in claim 22, in which the vanes are provided in pairs arranged to operate in antiphase relative to each other.

* * * * *